(12) United States Patent
Shinozaki et al.

(10) Patent No.: US 6,748,993 B1
(45) Date of Patent: Jun. 15, 2004

(54) ADHESIVE TAPE APPLICATOR

(75) Inventors: Mitsuhiko Shinozaki, Minoo (JP); Hisashi Ando, Toyota (JP)

(73) Assignee: Kansai Paint Co., Ltd., Hyogo (JP)

( * ) Notice: Subject to any disclaimer, the term of this patent is extended or adjusted under 35 U.S.C. 154(b) by 0 days.

(21) Appl. No.: 10/110,028

(22) PCT Filed: Aug. 2, 2000

(86) PCT No.: PCT/JP00/05187

§ 371 (c)(1),
(2), (4) Date: Apr. 3, 2002

(87) PCT Pub. No.: WO01/25077

PCT Pub. Date: Apr. 12, 2001

(30) Foreign Application Priority Data

Oct. 7, 1999 (JP) ............................................ 11/286968
Nov. 15, 1999 (JP) ............................................ 11/324703

(51) Int. Cl.$^7$ ............................................... B32B 31/00
(52) U.S. Cl. ....................... 156/391; 156/574; 156/579
(58) Field of Search ...................... 156/71, 574, 577, 156/579, 391

(56) References Cited

U.S. PATENT DOCUMENTS

| 5,820,725 | A | * | 10/1998 | Maeda et al. | 156/391 |
| 6,098,685 | A | | 8/2000 | Maeda | 156/391 |
| 6,508,287 | B1 | * | 1/2003 | Shinozaki et al. | 156/391 |
| 6,585,023 | B2 | * | 7/2003 | Azuhata | 156/574 |
| 2002/0056525 | A1 | * | 5/2002 | Kang | 156/574 |
| 2002/0062929 | A1 | * | 5/2002 | Azuhata | 156/574 |

FOREIGN PATENT DOCUMENTS

| JP | 05-338627 | | 12/1993 |
| JP | 1993-338627 | | 12/1993 |
| JP | 07-242364 | | 9/1995 |
| JP | 1995-242364 | | 9/1995 |
| JP | 09-132218 | | 5/1997 |
| JP | 1997-132218 | | 5/1997 |
| JP | 2000-118322 | | 4/2000 |
| JP | 2000-326930 | * | 11/2000 |
| JP | 2000-118322 | | 4/2002 |
| JP | 2003-63729 | * | 3/2003 |

* cited by examiner

Primary Examiner—Mark A. Osele
(74) Attorney, Agent, or Firm—Knobbe Martens Olson & Bear LLP (57) ABSTRACT

The present invention is an adhesive tape applicator 1 which applies an adhesive tape attached to a release liner to a door sash frame F of an automobile while removing the release liner as the adhesive tape applicator is moved along the door sash frame and comprises a holding element 2 which can slidably hold the door sash frame F, the holding element 2 comprising a guide element 11 which holds the door sash frame F and slidably guides the applicator and an elastic roller 9a which presses the adhesive tape to the door sash frame F. Thus, the present invention provides an adhesive tape applicator which is capable of applying an adhesive tape stably and accurately and provide an adhesive tape applicator which can realize improved operability and apply the adhesive tape at a high speed.

14 Claims, 12 Drawing Sheets

ADHESIVE TAPE APPLICATOR

BACKGROUND ART

The present invention relates to an adhesive tape applicator for applying an adhesive tape to door sash frames of automobiles.

TECHNICAL FIELD

Conventionally, pillars and door sash frames of automobiles have been painted in black or other colors in order to improve their appearance. However, painting requires additional manufacturing steps such as masking. Painting has also been causing environmental problems of evaporation of solvent into the atmosphere.

Figure 11:
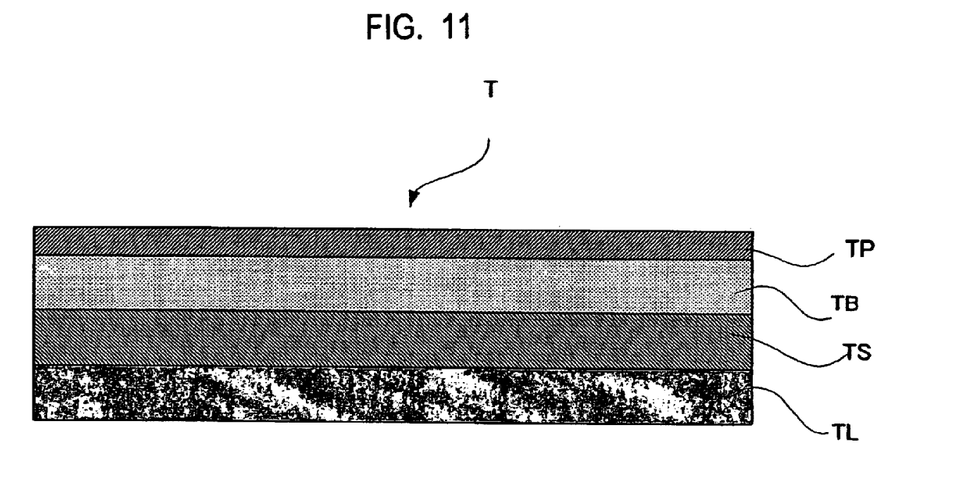
FIG. 11 is a sectional view of an adhesive tape.

In recent years, in order to solve such problems, adhesive tapes made of vinyl chloride and coated with an adhesive have been generally applied to door sash frames and the like. As shown in FIG. 11, an adhesive tape T comprises a base material TB having an adhesive layer TS on one side and a release liner TL covering the adhesive layer TS. The base material TB may be provided thereon with a transparent protective layer TP, if necessary. The base material TB is colored black or other colors.

However, the recent automobile designs include greatly curved door sash frames. Moreover, in some cases, some portions of the door sash frames are narrowed because of the process of curving the frames. When an adhesive tape is applied to the door sash frames of automobiles using an adhesive tape applicator, conventional adhesive tape applicators can not be moved smoothly along the curves, narrowed portions and the like. Thus, the adhesive tape may be deviated from the door sash frames.

In addition, although the application of adhesive tapes to door sash frames of automobiles is carried out in assembly line, conventional adhesive tape applicators require considerable time for positioning and setting the applicator on the door sash frames.

Since the application of adhesive tapes to door sash frames of automobiles is carried out in assembly line, an adhesive tape applicator which is capable of improving the appearance, manufacturing efficiency and quality of the door sash frames is desired.

Thus, the present invention provides an adhesive tape applicator which is capable of applying an adhesive tape stably and accurately and to provide an adhesive tape applicator which can realize improved operability and apply the adhesive tape at a high speed.

DISCLOSURE OF INVENTION

In order to solve the above problem, the present invention provides an adhesive tape applicator which applies an adhesive tape attached to a release liner to a door sash frame of an automobile while removing the release liner as the adhesive tape applicator is moved along the door sash frame and comprises a holding element which can slidably hold the door sash frame, the holding element comprising a guide element which slidably holds the door sash frame and guides the applicator and an elastic roller which presses the adhesive tape to the door sash frame.

The present invention also provides an adhesive tape applicator which applies an adhesive tape attached to a release liner to a door sash frame of an automobile which removing the release liner as the adhesive tape applicator is moved along the door sash frame, the applicator comprising a holding element which can slidably hold the door sash frame, the holding element comprising a guide element which holds the door sash frame and slidably guides the applicator and a pressing portion which presses the adhesive tape to the door sash frame, the guide element comprising nip rollers disposed opposite each other, at least two of the opposing nip rollers being on one side and one being on the other side, the opposing nip rollers being supported so that they can be moved towards or away from each other and resiliently urged in a closing direction.

The guide element preferably comprises nip rollers disposed opposite each other, at least two of the opposing nip rollers being on one side and one being on the other side.

The opposing nip rollers are preferably supported so that they can be moved towards or away from each other and resiliently urged in a closing direction.

The holding element comprises a pair of opposing holding pieces, a first holding piece and second holding piece, which are preferably supported so that they can be moved towards or away from each other in the opposing direction and are resiliently urged in a closing direction.

The holding pieces preferably comprise the pair of opposing first and second holding pieces. The second holding piece preferably comprises the elastic roller and a tape supply guide which is disposed on the side opposite the pressing side of the elastic roller and guides the adhesive tape in the applicator sliding direction.

The elastic roller is preferably provided slidably in the axial direction of the elastic roller. A guide roller which elastically contacts the door sash frame in said axial direction and keeps the elastic roller in a fixed position relative to the door sash frame is preferably provided.

The tape supply guide preferably comprises a holder which slidably holds the adhesive tape. The holder preferably has a swingable plate which is resiliently urged in the direction to cover the adhesive tape so that the adhesive tape does not come off the tape supply guide.

The tape supply guide is preferably mounted on the second holding piece in a positionally adjustable manner relative to the widthwise direction of the adhesive tape.

The holding pieces preferably has the following structure: it comprise a pair of opposing first and second holding pieces; on the second holding piece are fixedly mounted slide shafts which extend through the first holding piece and slidably support the first holding piece; a grip is fixedly mounted at the ends of the slide shafts; an urging member which urges the first holding piece towards the pressing direction described above is preferably disposed between the first holding piece and at least one of the grip and the second holding piece; and the first holding piece has a projection onto which the fingers of the operator can be placed.

BRIEF DESCRIPTION OF DRAWINGS

FIG. 1 is a perspective view which shows a first embodiment of the adhesive tape applicator according to the present invention together with the door sash frame.

BEST MODE FOR CARRYING OUT THE INVENTION

The first embodiment of the adhesive tape applicator according to the present invention will be explained referring to FIGS. 1 to 11 below.

Figure 9:
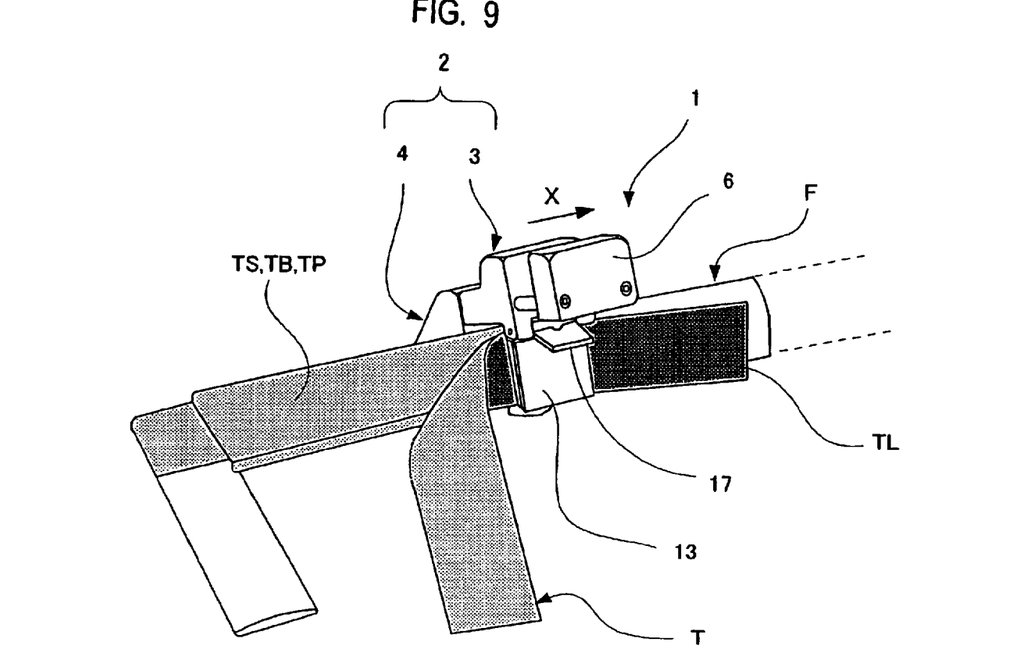
FIG. 9 is a perspective view which shows the adhesive tape applicator of FIG. 1 when in use.

FIG. 1 shows a section of the door sash frame F to which the adhesive tape T is applied by the present applicator. The door sash frame F integrally comprises a main frame body F1 having a surface to which the adhesive tape T is applied, a reinforcing projection F2 projecting from the rear side of the main frame body F1 and a weather strip-attached portion F3 provided on the outer surface of the reinforcing projection F2. In the description below, an embodiment of an adhesive tape applicator having such a structure which is suitable for applying adhesive tape to an outer surface of the door sash frame F will be explained. The adhesive tape T used is similar to known ones and thus is referred to by the same numerals. Hereinafter the term "base material" denotes an adhesive layer TS and protective layer TP collectively. Use of the applicator will be described in detail below. FIG. 9 shows the applicator in use.

An adhesive tape applicator 1 is provided with a holding element 2 which can slidably hold the door sash frame F. The holding element 2 may have a first holding piece 3 and second holding piece 4 which are opposing each other.

Slide shafts 5,5 are fixedly mounted on a second holding piece 4. The first holding piece 3 is passed through by and slidably supported on the slide shafts 5,5. A compression spring 7 is provided between a grip 6 fixedly mounted at the ends of the slide shafts 5,5 and the first holding piece 3. Alternatively, a tension spring (not shown) may be provided between the grip 6 and the second holding piece 4. The first holding piece 3 preferably has a projection 8 to be held by the fingers of the operator.

The first holding piece 3 has a pressing portion 9 which presses the adhesive tape T. The pressing portion 9 may be an elastic roller 9a which is rotatably mounted on the first holding piece 3. The elastic roller 9a can be formed by covering its rotation shaft with an elastic material such as soft rubber, sponge, etc.

When applying the adhesive tape T to the door sash frame F with the elastic roller 9a, the shape of the elastic roller 9a changes depending on the outer shape of the door sash frame F by applying force to the soft elastic roller 9a in the direction of application of the adhesive tape T. Accordingly, the adhesive tape T can be fittingly applied to the door sash frame F and no air bubble is caught therebetween. However, forcing the elastic roller 9a to the outer surface of the door sash frame F increases the contact portion therebetween. The increased contact portion and the pressure applied thereto may cause a somewhat large amount of friction between the adhesive tape T and elastic roller 9a. Although the friction is not problematic when applying tape to straight portions of the door sash frame F, it causes many problems at curved portions: when the elastic roller 9a turns to the direction of the curve, the elastic roller 9a may twist the adhesive tape T by the friction. Thus the position of the adhesive tape T is not stable. Twists in the adhesive tape T may result in wrinkles when the curve is sharp. In this case, a foamed material produced by cutting a foamed substance such as a sponge rubber is used to form at least the outer layer of the elastic roller 9a. The surface of such a foamed material exhibits a coefficient of friction much lower than a non-foamed material, even though it is made of a material having a relatively high coefficient of friction such as natural rubber, synthetic rubber, silicone rubber and the like. Accordingly, the use of a foamed substance for the elastic roller achieves stable and desirable positioning of the adhesive tape T at curved portions, as well as straight portions, of the door sash frame F. The use of a foamed substance also prevents wrinkle in the adhesive tape T.

Figure 2:
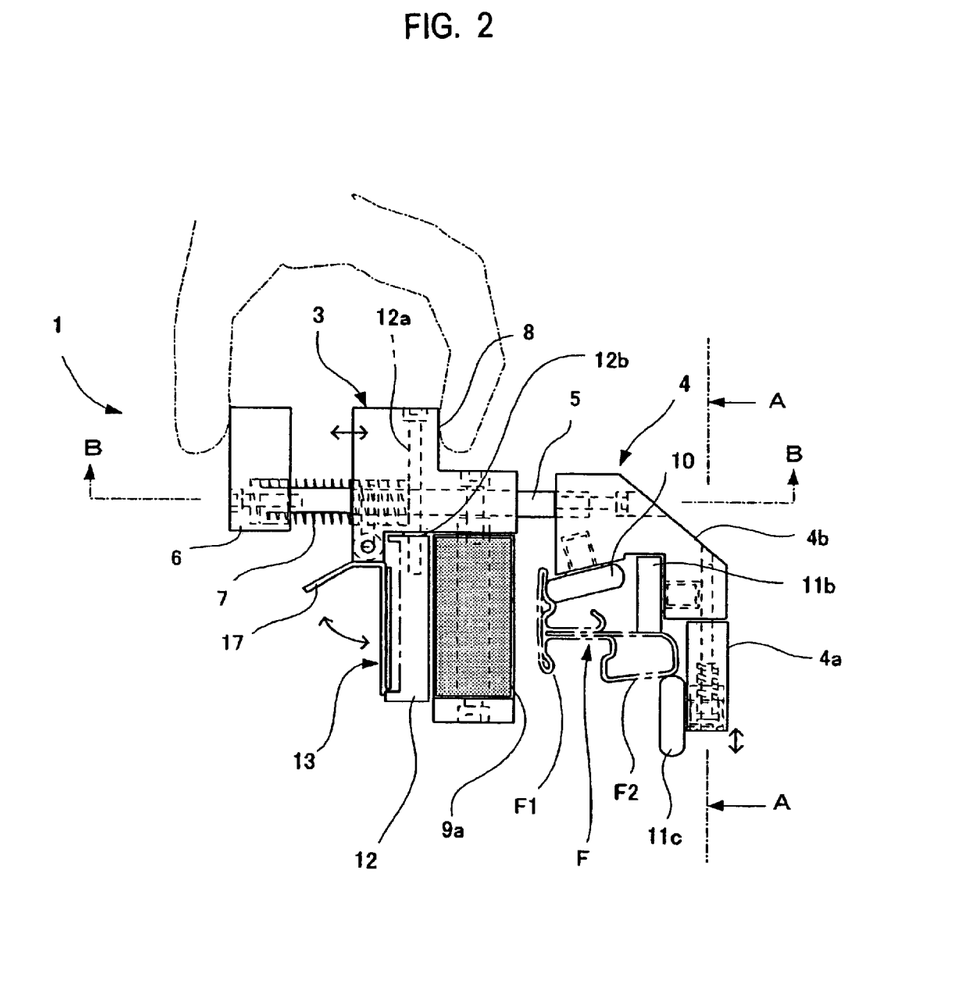
FIG. 2 is a front view of the adhesive tape applicator of FIG. 1 seen in the direction X in FIG. 1.
Figure 10:
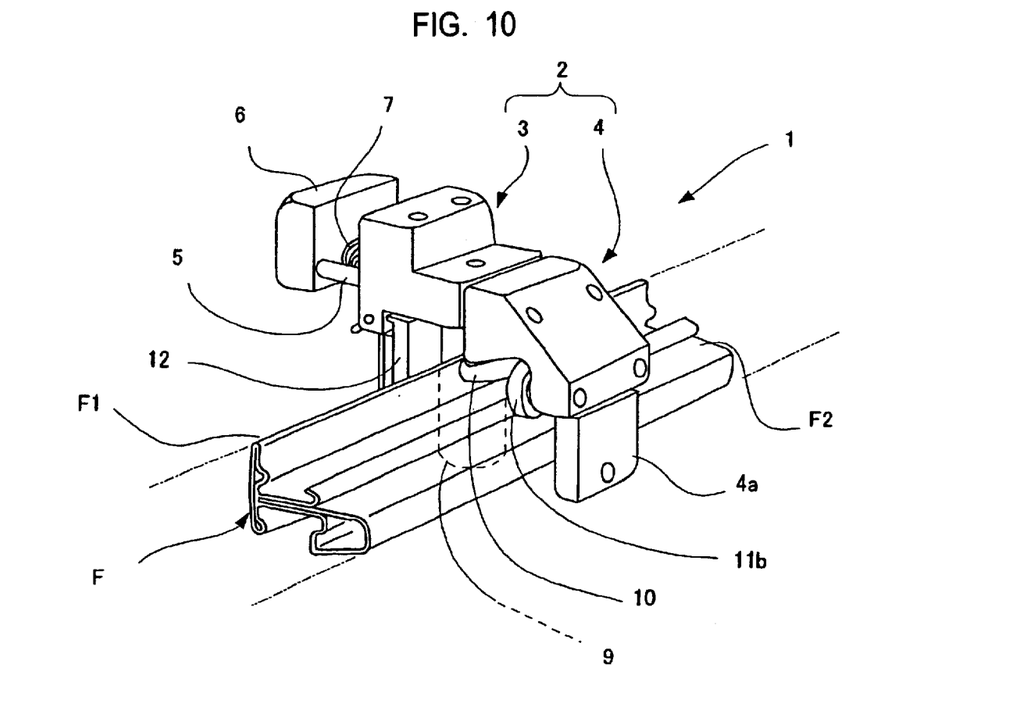
FIG. 10 is a perspective view which shows the adhesive tape applicator of FIG. 1 when attached to a door sash frame.

The second holding piece 4 may be provided with a guide roller 10 which co-operates with the elastic roller 9a to hold and slidably guide the door sash frame F. The guide roller 10 may be disposed at a position which contacts the rear surface of the main frame body F1, as shown in FIGS. 2 and 10.

The second holding piece 4 has a guide element which holds the door sash frame F therebetween and slidably guides the applicator 1 along the door sash frame F. The guide element may be opposing nip rollers 11a, 11b, 11c. The nip rollers 11a and 11b are disposed parallel to the direction that the applicator 1 is moved (the direction shown by arrow X in FIG. 1: hereinafter referred to as "applicator sliding direction"). The nip rollers 11a, 11b and 11c are preferably disposed in such an arrangement that their centers of rotation form an approximately isosceles triangle having the vertex angle at the center of rotation of the nip roller 11c.

The second holding piece 4 has a shaft base 4a which supports the shaft of the nip roller 11c. The second holding piece 4 preferably has an urging member which supports the shaft base in such a manner that the shaft base can be moved towards or away from a base 4b and urges the shaft base towards the base 4b (the direction shown by arrow Y in FIG. 1). The second holding piece 4 shown in FIG. 7, for example, has the following structure: a pair of shaft holes 4c, 4c are provided on the shaft base 4a. Slide shafts 4d, 4d projecting from the base 4b are inserted through the shaft holes 4c, 4c. Spring housings 4e having a large diameter are formed inside the shaft holes 4c, 4c and compression springs 4f are accommodated inside the spring housings 4e. Spring bearings 4g provided at the ends of the slide shafts 4d, 4d receive the compression springs 4f.

Figure 5:
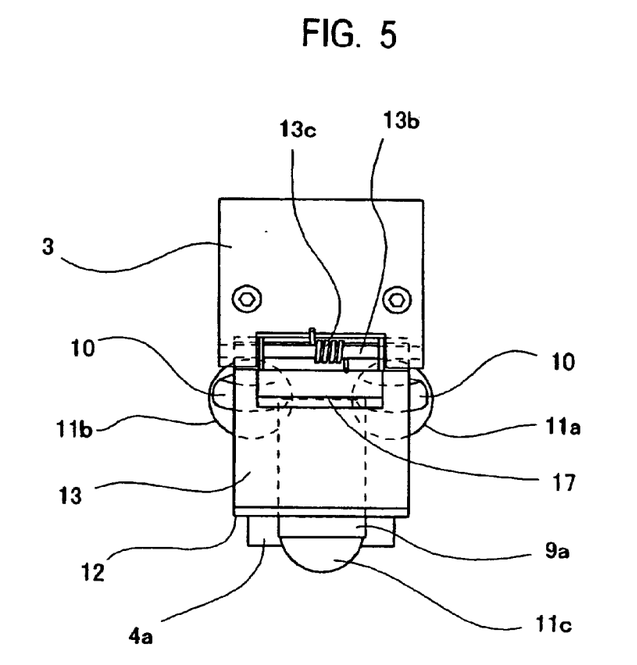
FIG. 5 is a left side view of the adhesive tape applicator shown in FIG. 1.
Figure 6:
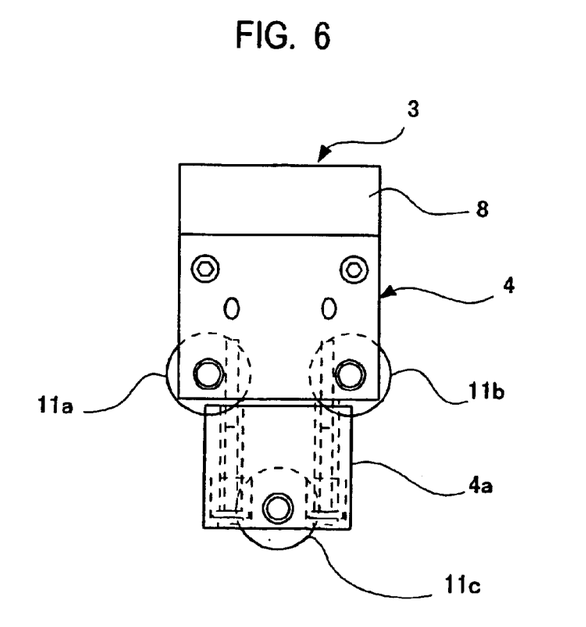
FIG. 6 is a right side view of the adhesive tape applicator shown in FIG. 1.
Figure 7:
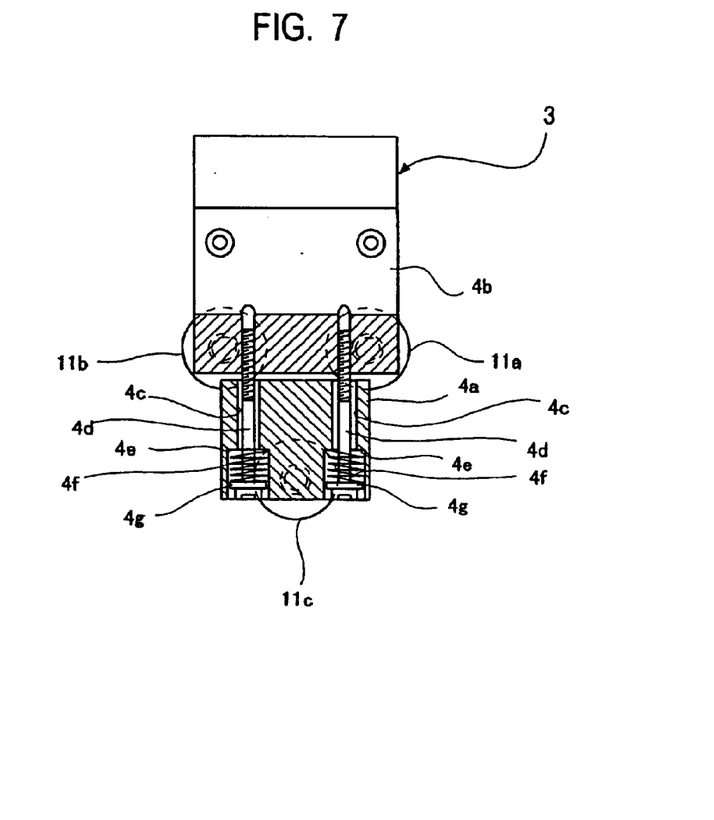
FIG. 7 is a sectional view taken along line A—A of FIG. 2.
Figure 8:
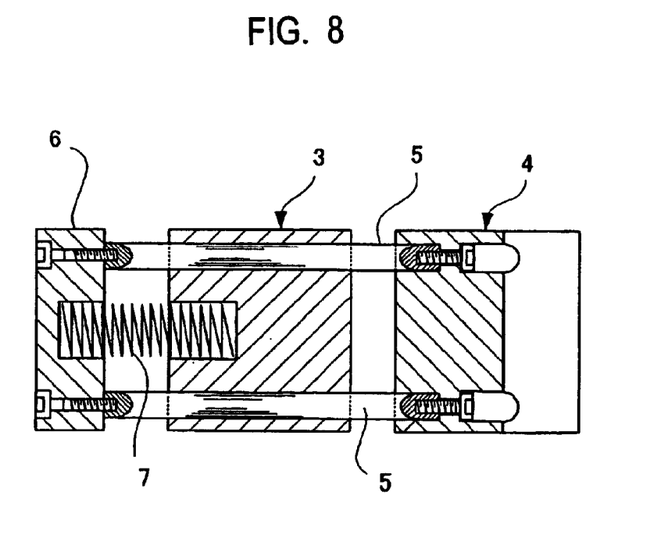
FIG. 8 is a sectional view taken along line B—B of FIG. 2.

The second holding piece 4 has a tape supply guide 12 which is disposed opposite to the pressing side of the elastic roller 9a and guides the adhesive tape T in the applicator sliding direction X. The tape supply guide 12 may have a holder 13 which slidably holds the adhesive tape T. The holder 13 has a swingable plate 13a which is resiliently urged in the direction to cover the adhesive tape. The swingable plate 13a prevents the adhesive tape T from falling out of the guide 12 by covering the guide 12. The swingable plate 13a is resiliently urged by a torsion spring 13c which is placed around a rotation shaft 13b (FIG. 5). It is preferable that the adhesive tape T is held by another elastic roller (not shown) instead of the swingable plate so that tension is not applied to the adhesive tape T. To facilitate opening and closing, the holder 13 preferably has a lever 17 which is connected to the swingable plate 13a.

The position of the tape supply guide 12 is preferably adjustable in the widthwise direction of the adhesive tape T. As shown in FIG. 2, for example, the position of the tape supply guide 12 can be adjusted by providing a ring washer 12b on the shaft 12a which supports the tape supply guide 12 on the first holding piece 3 and changing the number of the ring washers. This enables fine adjustment of the position of the tape supply guide 12 in the widthwise direction of the adhesive tape T.

Next, the application operation of the adhesive tape T using the adhesive tape applicator 1 will be explained.

Figure 3:
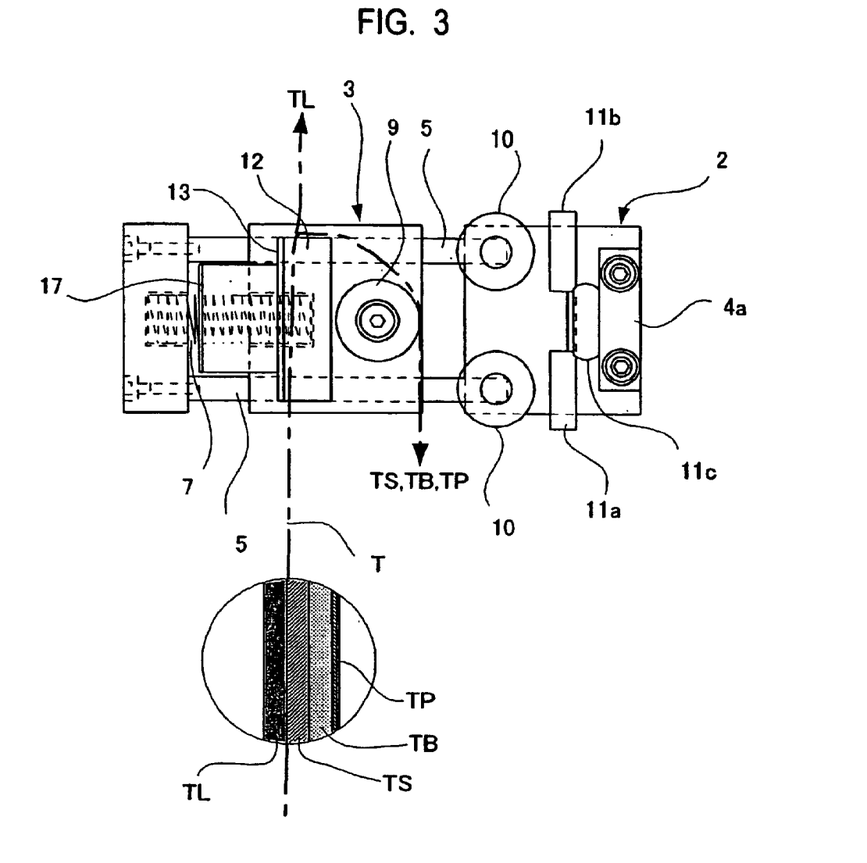
FIG. 3 is a bottom view of the adhesive tape applicator shown in FIG. 1.
Figure 4:
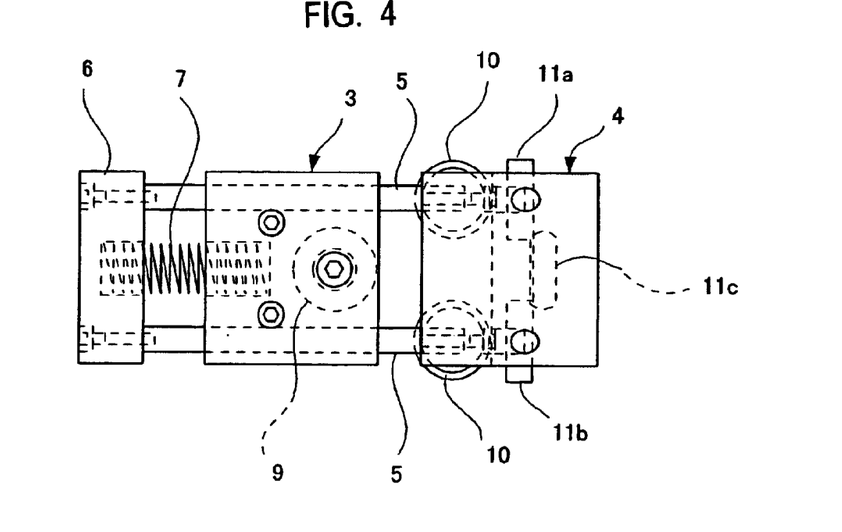
FIG. 4 is a plan view of the adhesive tape applicator shown in FIG. 1.

First, the holder 13 is opened against the resilient force of the torsion spring 13c (FIG. 5) and the adhesive tape T is inserted into the tape supply guide 12. The holder 13 is closed to keep the adhesive tape T within the tape supply guide 12 (FIG. 3). At this time, the base material TB of the adhesive tape T is placed in contact with the tape supply guide 12 with its the release liner TL side facing the holder 13. A predetermined length of the front end of the adhesive tape T is pulled out from the tape supply guide 12 and the release liner TL corresponding to the portion pulled out is removed.

Next, as shown in FIG. 2, the grip 6 and the projection 8 are held by fingers to move the first holding piece 3 and the second holding piece 4 away from each other against the resilient force of the compression spring 7. The front end of the base material TB where the release liner TL has been removed is turned back around the elastic roller 9a, passed between the first holding piece 3 and second holding piece 4 (the chain line in FIG. 3) and placed with the adhesive layer TS facing the second holding piece 4.

While the first holding piece 3 and second holding piece 4 are detached, the adhesive tape applicator 1 is approached to a predetermined portion of a tape receiving face (the outer face in this example) of the door sash frame F. Then, the reinforcing projection F2 of the door sash frame F is inserted between the nip roller 11c and nip rollers 11a, 11b (see FIG. 2). At this stage, the shaft base 4a of the nip rollers 11 can be moved away from the base 4b against the resilient force of the accommodated compression springs 4f (see FIG. 7). Thus, the reinforcing projection F2 can be inserted (FIG. 2) between and resiliently held by the nip rollers 11c, 11a, 11b.

Then, the front end of the base material TB is applied to a predetermined position of the door sash frame F. The operator releases the grip 6 and the projection 8 to move the first holding piece 3 and second holding piece 4 towards each other by the resilient force of the compression spring 7. The guide roller 10 and elastic roller 9a then press the adhesive tape T against the front surface of the main frame body F1 and slidably hold the main frame body F1 (FIG. 10). The guide roller 10 contacts the rear face of the main frame body F1.

While the adhesive tape T and the adhesive tape applicator 1 are attached to the door sash frame F, the adhesive tape applicator 1 is moved along the door sash frame F in the direction that the adhesive tape T is applied (the direction shown by arrow X in FIG. 9 (the applicator sliding direction)). As the adhesive tape applicator 1 is moved, only the base material TB (TS, TP) of the adhesive tape T is transferred from the tape supply guide 12 and turned 180° along the surface of the elastic roller 9a. The release liner TL made of paper, plastic, etc., however, is not turned but transferred in the sliding direction of applicator because the release liner TL is hard enough so that it is not transferred around the elastic roller 9a along with the base material TB. Therefore, the release liner TL is removed from the base material TB (see FIGS. 3 and 9) as the adhesive tape T advances.

As is apparent from the above description, the adhesive tape applicator 1 having the above structure have the effects described below in applying the adhesive tape T to the door sash frame.

The holding element 2 positions the adhesive tape applicator 1 relative to the direction of thickness of the door sash frame F (the perpendicular direction to the adhesive tape receiving face), and the guide element (11a, 11b, 11c) position the adhesive tape T relative to the perpendicular direction to the thickness of the door sash frame and to the sliding direction of the adhesive tape applicator 1. Therefore, the adhesive tape applicator 1 can apply the adhesive tape T simply by moving the adhesive tape applicator 1 along the door sash frame F.

The pressing area of the elastic roller 9a is elastic. Thus even when the door sash frame F has a convex surface, the elastic roller 9a can fit the entire curved surface. In addition, the elastic roller 9a can apply uniform pressure to the entire surface. Accordingly, the adhesive tape T can be firmly pressed against the entire curved surface and applied to the door sash frame F without failure in the application of the adhesive tape T.

Forming the above guide element utilizing the pinching structure of the nip roller 11c and nip rollers 11a and 11b which can be moved towards or away from each other and resiliently are urged in the closing direction has the following advantage: such guide element can stably stay on the curved and narrow portions of the door sash frame F, which were described in the prior art, because the guide element resiliently support the reinforcing projection F2 of the door sash frame at three points. This prevents mispositioning of the adhesive tape T relative to the door sash frame F (especially in the widthwise direction of the adhesive tape) and affords accurate holding of the door sash frame F. Therefore, the adhesive tape T can be applied to an accurate position.

Further, by supporting the first holding piece 3 and the second holding piece 4 so that they can be approached to each other and resiliently urging them in the approaching direction, the elastic roller 9a is elastically forced against the door sash frame F. This structure does not require an additional means for forcing the elastic roller 9a against the door sash frame F, for example, fastening mechanism using screws, toggle clamps, etc. Therefore, the elastic roller 9a can exert the desired pressure simply by holding the door sash frame F with the adhesive tape applicator 1.

Providing the second holding piece 4 with the tape supply guide, which is disposed on the side opposite the pressing side of the elastic roller 9a and guides the adhesive tape T in the applicator sliding direction, prevents mispositioning of the adhesive tape T relative to the widthwise direction and ensures removal of the release liner TL from the base material TB.

Providing the tape supply guide 12 with the holder 13 prevents the adhesive tape T from leaving the tape supply guide 12, thereby facilitating the holding operation of the adhesive tape T. Since excessive tension may elongate the adhesive tape T during application, the holder 13 preferably has a structure which can minimize the friction applied to the adhesive tape T.

The first and second holding pieces may have the following structure: the slide shafts 5 which extend through the first holding piece 3 and slidably support the first holding piece 3 are fixed to the second holding piece 4; the grip 6 is fixed to the end of the slide shaft 5; the compression spring 7 which urges the first holding piece 3 in the pressing direction is disposed between the grip 6 and the first holding piece 3; and the first holding piece 3 is provided with the projection 8 to be held by the fingers of the operator. With this structure, the first holding piece 3 and the second holding piece 4 can be pulled away from each other by simply holding the grip 6 and projection 8 with the fingers (or the palm of the hand) and pulling them close to each other against the resilient force of the compression spring 7.

Further, holding the door sash frame F by the elastic roller 9a, guide roller 10, nip rollers 11a, 11b and 11c, as mentioned in the above, allows the adhesive tape applicator 1 to move at a high speed.

Figure 12:
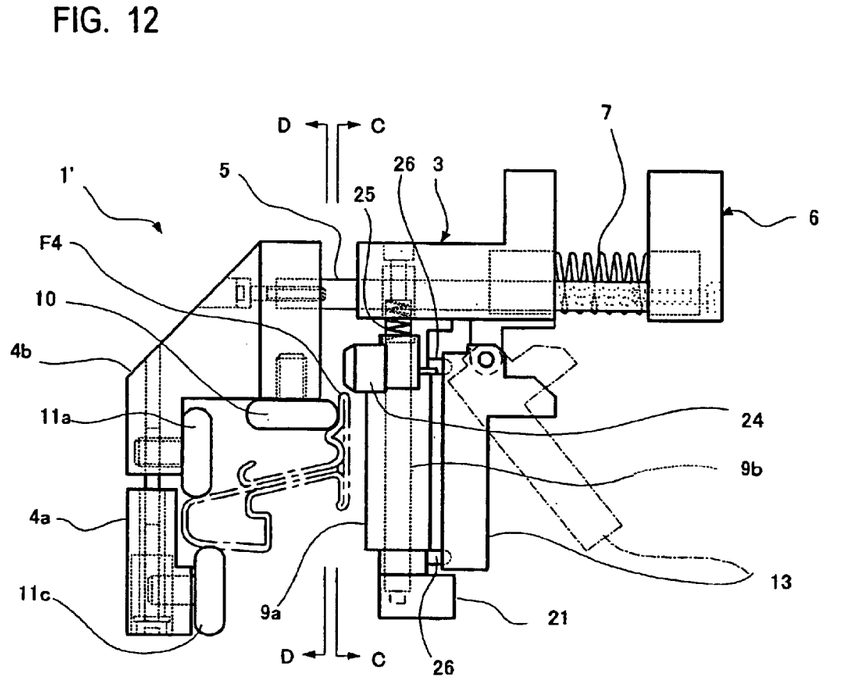
FIG. 12 is a front view which shows a second embodiment of the adhesive tape applicator according to the present invention.
Figure 13:
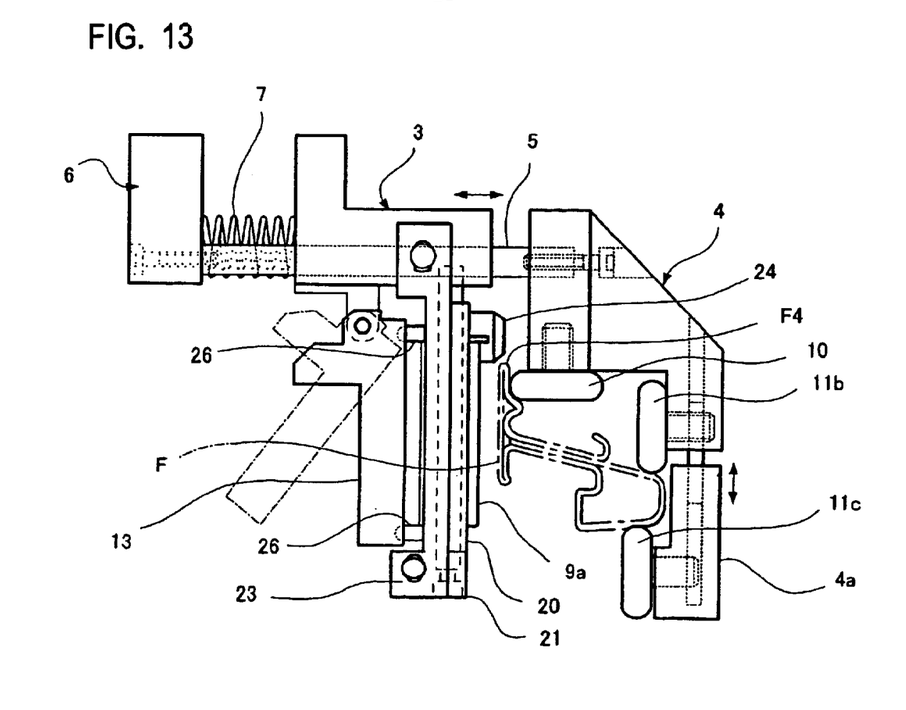
FIG. 13 is a rear view of the adhesive tape applicator shown in FIG. 12.
Figure 14:
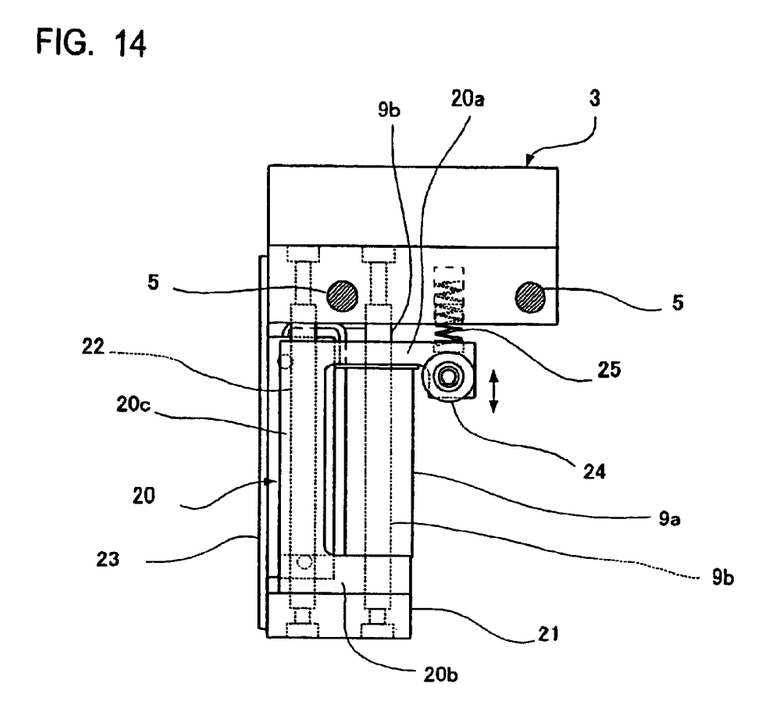
FIG. 14 is a sectional view taken along line C—C of FIG. 12.
Figure 15:
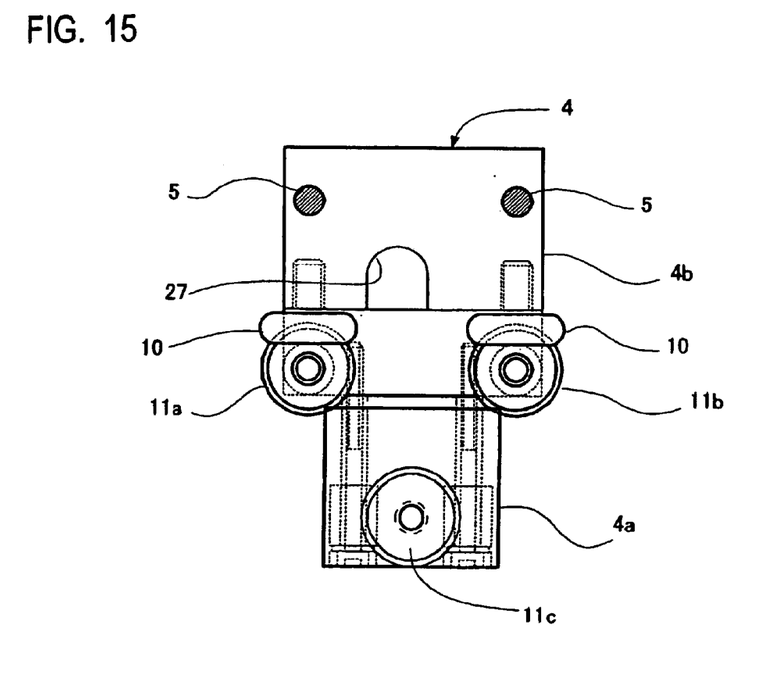
FIG. 15 is a sectional view taken along line D—D of FIG. 13.
Figure 16:
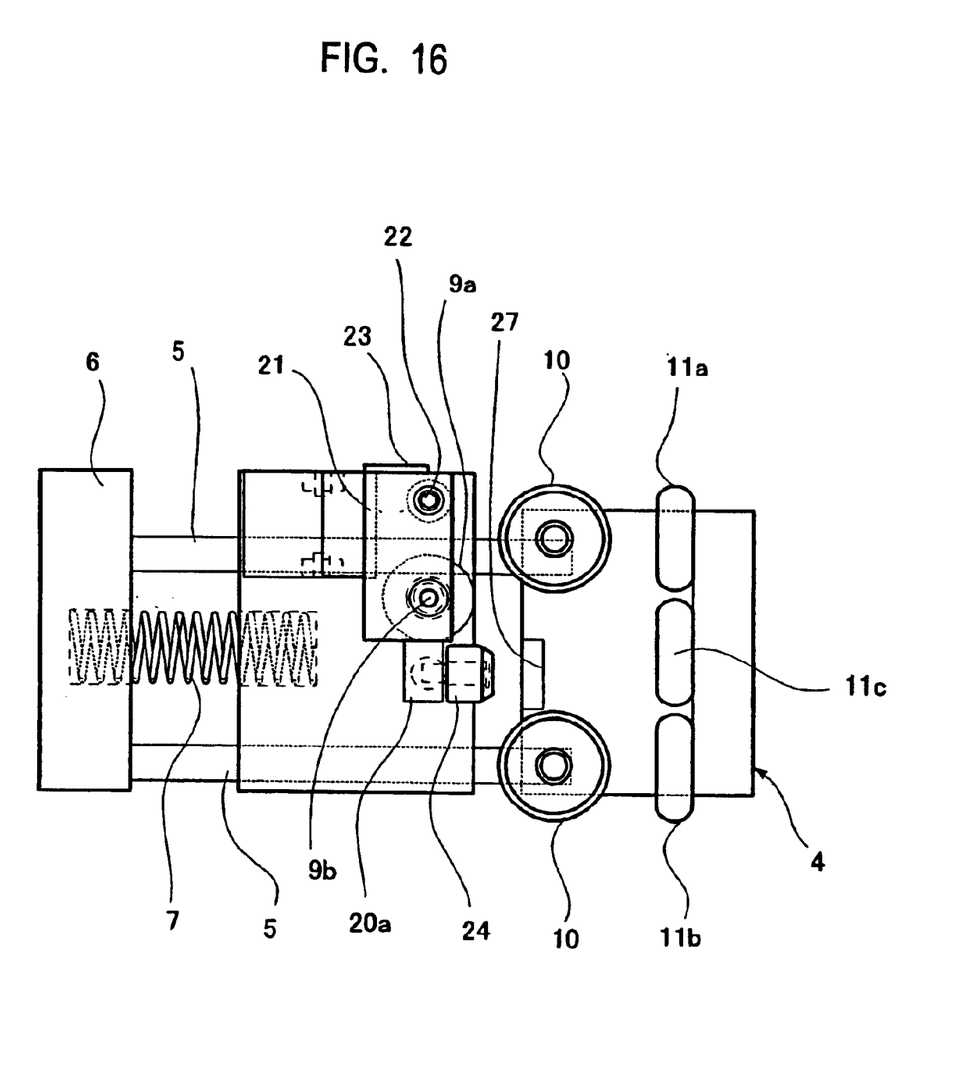
FIG. 16 is a bottom view of the adhesive tape applicator shown in FIG. 12.

Next, the second embodiment of the adhesive tape applicator of the present invention will be explained referring to FIGS. 12 to 16 below. FIG. 12 is a front view; FIG. 13 is a rear view; FIG. 14 is a sectional view taken along line C—C in FIG. 12; FIG. 15 is a sectional view taken along line D—D in FIG. 15; and FIG. 16 is a bottom view. In these FIGS., the same components as in the above embodiment are denoted by the same numerals and their detailed description is eliminated.

The elastic roller 9a is attached around the rotation shaft 9b slidably in the direction of the shaft. Further, a frame 20 which is approximately shaped like a block letter "C" is slidably attached to the rotation shaft 9b which extends through flanges 20a, 20b provided at both ends of the elastic roller 9a. The rotation shaft 9b is fixed to a first holding portion 3 at one end and to a stopper block 21 at the other end.

The slide shaft 22 extends through a web 20c of the frame 20. The slide shaft 22, as well as the rotation shaft 9b, is fixed to the first holding piece 3 at one end and to the stopper block 21 at the other end. The stopper block 21 is connected and fixed to the first holding piece 3 with a reinforcing metal plate 23 provided therebetween.

The flange 20a of the frame 20 near the first holding piece 3 is extended and a guide roller 24 is rotatably connected to the end of the flange 20a Between this extended portion and the first holding piece 3 is disposed an elastic member, compression coil spring 25. By the urging force of the compression coil spring 25, the frame 20 and elastic roller 9a are resiliently urged downward in FIG. 14 along the rotation shaft 9b. The guide roller 24 elastically contacts with the upper edge F4 of the door sash frame F when the applicator is attached to the door sash frame F.

The web 20c of the frame 20 has a pair of guide pins 26, 26, for the tape supply guide, which are projecting towards the holder 13 (see FIG. 13). The portions of the holder 13 which contact the guide pins 26 have indentations which receives the ends of the guide pins 26. The guide pins 26 keep the gap between the frame 20 and holder 13 wide enough to prevent friction of the adhesive tape passing therethrough.

In all of these FIGS., the first holding piece 3 and the second holding piece 4 are pulled away from each other against the resilient force of the compression spring 7. In this embodiment, the guide roller 24 projects from the edge face of the first holding piece 3. Thus, an indentation 27 which receives the guide roller 24 is formed at a position opposite to the second holding piece 4 (see FIGS. 15 and 16) so that the end of the guide roller 24 does not contact the second holding piece 4 when the first and second holding pieces 3 and 4 are pressed against each other.

The adhesive tape applicator 1' having the above structure can keep a favorable application position when the door sash frame F, to which the adhesive tape is applied, is curved by fitting the elastic roller 9a to the curve. This will be explained in detail referring to FIGS. 17–20 below and in comparison to the first embodiment above.

Figure 17:
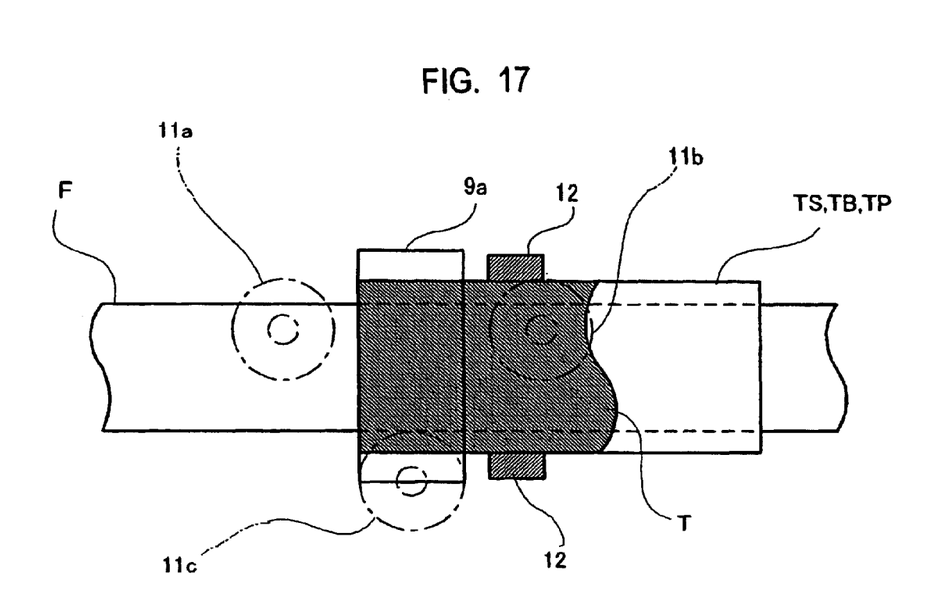
FIG. 17 is an illustration which schematically shows the state of an adhesive tape being applied to a door sash frame using the adhesive tape applicator of the first embodiment.
Figure 18:
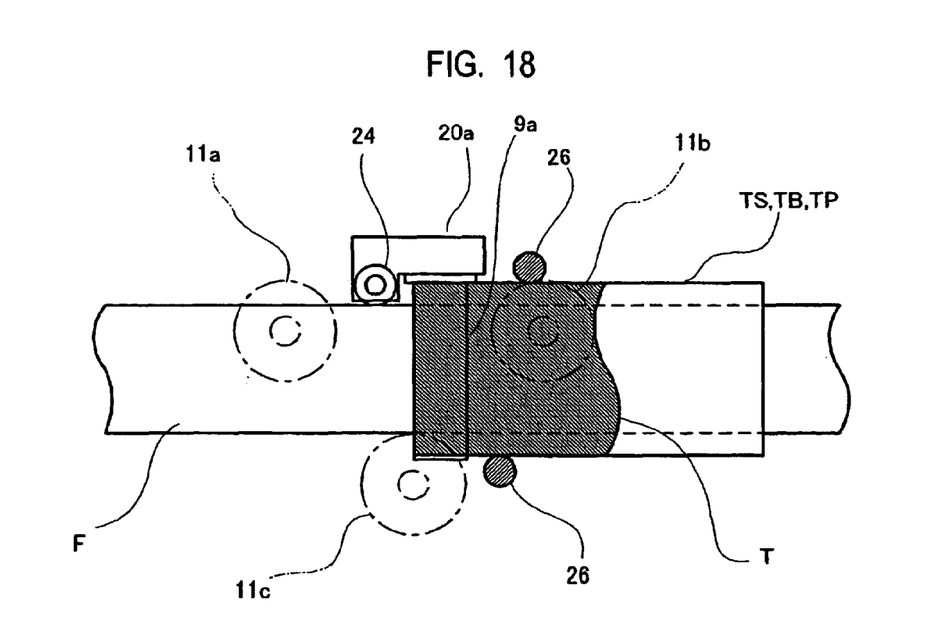
FIG. 18 is an illustration which schematically shows the state of an adhesive tape T being applied to a door sash frame 20 using the adhesive tape applicator of the second embodiment.
Figure 19:
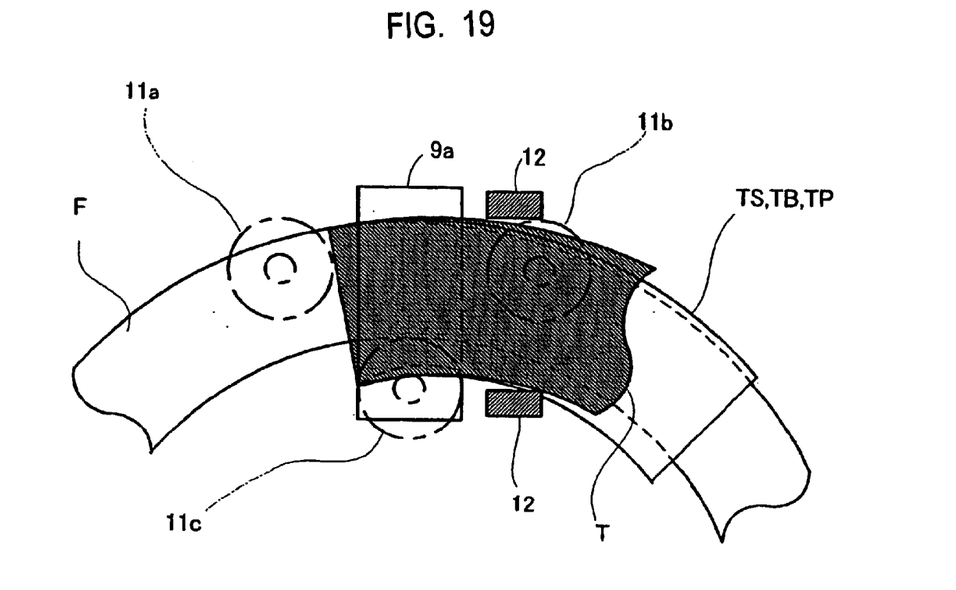
FIG. 19 is an illustration corresponding to FIG. 17 in which the door sash frame is curved.
Figure 20:
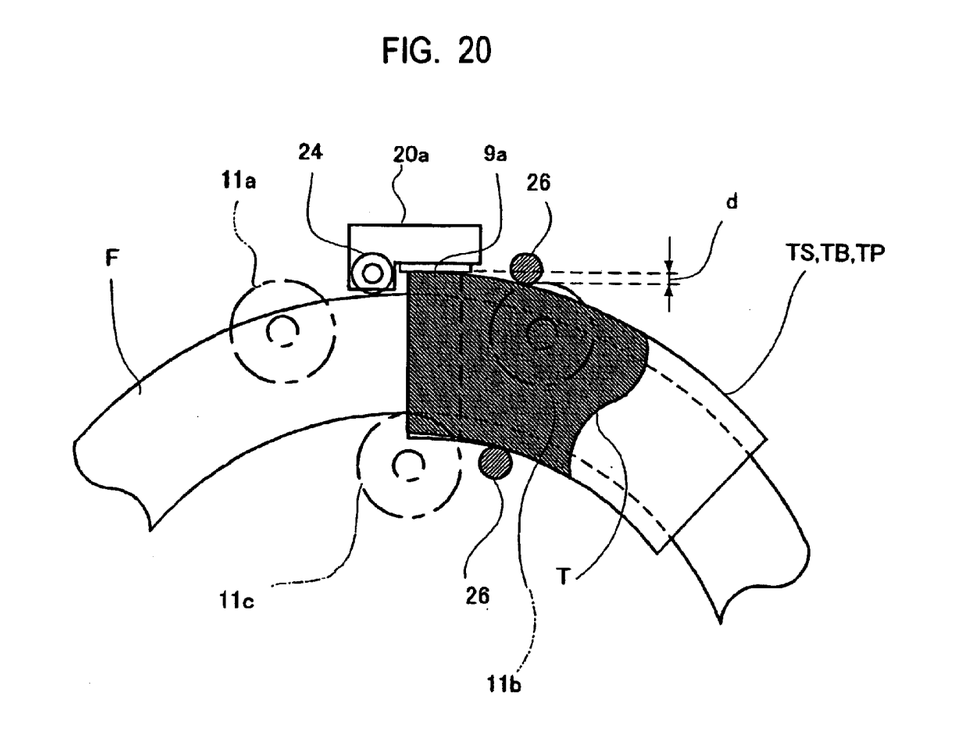
FIG. 20 is an illustration corresponding to FIG. 18 in which the door sash frame is curved.

FIGS. 17 and 19 schematically show the application of the adhesive tape T to the door sash frame F using the adhesive tape applicator according to the first embodiment. FIGS. 18 and 20 schematically show the application of an adhesive tape to the door sash frame F using the adhesive tape applicator according to the second embodiment. In FIGS. 17–20, for the explanation convenience, only the elastic roller 9a, nip rollers 11a, 11b, 11c, guide pins 26, tape supply guide 12, door sash frame F and adhesive tape T are shown. In FIGS. 19 and 20, the curvature of the door sash frame F is exaggerated. In the FIGS., the adhesive tape T is transferred from the right to the elastic roller 9a where it is turned back and applied to the left of the elastic roller 9a. In these FIGS., the shaded part of the adhesive tape T indicates the rear side of the adhesive tape before being applied, and the unshaded part indicates the front side of the adhesive tape T applied to the door sash frame F.

As shown in FIGS. 17 and 18, when the door sash frame F is straight and the adhesive tape T is applied from right to left, the adhesive tape T is supplied parallel to the door sash frame F by the operation of the nip rollers 11a, 11b, 11c and the tape supply guide 12 (or the guide pins 26). Therefore, in this case, the adhesive tape T is applied to the door sash frame F while maintaining a fixed position relative to the door sash frame F.

However, in the first embodiment, a curved portion of the door sash frame F, the upper end of the door sash frame F between the nip roller 11a and 11b is shifted upward, but the positions of the elastic roller 9a and tape supply guide 12 are not changed, as shown in FIG. 19. This is because the positions of the elastic roller 9a and tape supply guide 12 relative to the nip rollers 11a and 11b are fixed. Therefore, as shown in FIG. 19, at such curved portions the curvature of the adhesive tape T does not match the positions of the door sash frame F and tape supply guide 12. This may result in mispositioning of the applied adhesive tape T and wrinkles in the adhesive tape due to slackening of the tape.

However, in the second embodiment, as shown in FIG. 20, the elastic roller 9a is shifted upward (shown as d in the FIG.) relative to the guide pin 26 by the action of the guide roller 24 and thus the relative position of the elastic roller 9a and door sash frame F is maintained. This enables application of the adhesive tape T to the curvature of the door sash frame F at a fixed position. Because the position of the guide pin 26 is fixed relative to the nip rollers 11a and 11b and the elastic roller 9a is shifted upward based on the curvature of the adhesive tape T, the adhesive tape T is not excessively bent, slackened or wrinkled during application.

As is apparent from the above description, the adhesive tape applicator of the present invention achieves stable posture of the applicator during application, rapid, accurate application, stable supply of the adhesive tape and other advantages.

What is claimed:

1. An adhesive tape applicator which applies an adhesive tape attached to a release liner to a door sash frame of an automobile while removing the release liner as the adhesive tape applicator is moved along the door sash frame, the applicator comprising a holding element which can slidably holds the door sash frame, the holding element comprising:

a pair of opposing first and second holding pieces, on the second holding piece are fixedly mounted slide shafts which extend through the first holding piece and slidably support the first holding piece, a grip is fixedly mounted at the ends of the slide shafts, an urging member which urges the first holding piece towards the pressing direction is disposed between the first holding piece and at least one of the grip and the second holding piece, and the first holding piece has a Projection onto which the fingers of the operator can be placed;

a guide element which slidably holds the door sash frame and guide the applicator; and an elastic roller which presses the adhesive tape to the door sash frame.

2. The adhesive tape applicator according to clam 1, wherein the guide element comprises nip rollers disposed opposite each other, at least two of the nip rollers being on one side and one being on the other side.

3. The adhesive tape applicator according to claim 2, wherein the opposing nip rollers are supported so that they can be moved towards or a way from each other and resiliently urged in a closing direction.

4. The adhesive tape applicator according to clam 1, wherein the holding element comprises a pair of opposing holding pieces, a first holding piece and second holding piece, which are supported so that they can be moved towards or away from each other in the opposing direction, and are resiliently urged in a closing direction.

5. The adhesive tape applicator according to according to claim 1, wherein the holding element is provided with a guide roller which co-operates with the elastic roller to slidably hold the door sash frame.

6. The adhesive tape applicator according to claim 1, wherein the elastic roller is covered with a sponge rubber.

7. An adhesive tape applicator which applies an adhesive tape attached to a release liner to a door sash frame of an automobile while removing the release liner as the adhesive tape applicator is moved along the door sash frame, the applicator comprising a holding element which can slidably hold the door sash frame, the holding element comprising:

a pair of opposing first and second holding pieces, the second holding niece comprising an elastic roller and a tape supply guide which is disposed on the side opposite the pressing side of the elastic roller and guides the adhesive tape in the applicator sliding direction;

a guide element which holds the door sash frame and slidably guides the applicator, and a pressing portion which presses the adhesive tape to the door sash frame, the guide element comprising nip rollers disposed opposite each other, at least two of the nip rollers being on one side and one being on the other side, the opposing nip rollers being supported so that they can be moved towards or away from each other and resiliently urged in a closing direction.

8. The adhesive tape applicator according to claim 7, wherein first holding piece and the second holding piece, supported so that they can be moved towards or away from each other in the opposing direction and are resiliently urged in a closing direction.

9. The adhesive tape applicator according to claim 7, wherein the tape supply guide is mounted on the second holding piece in a positionally adjustable manner relative to the widthwise direction of the adhesive tape.

10. An adhesive tape applicator which applies an adhesive tape attached to a release liner to a door sash frame of an automobile while removing the release liner as the adhesive tape applicator is moved along the door sash frame, the applicator comprising a holding element which can slidably holds the door sash frame, the holding element comprising a pair of opposing holding pieces, a first holding piece and second holding piece, which are supported so that they can be moved towards or away from each other in the opposing direction and are resiliently urged in a closing direction, and [The adhesive tape applicator according to claim 1, wherein the holding pieces comprise the pair of opposing first and second holding pieces,] the second holding piece comprising the elastic roller and a tape supply guide which is disposed on the side opposite the pressing side of the elastic roller and guides the adhesive tape in the applicator sliding direction, a guide element which slidably holds the door sash frame and guide the applicator and an elastic roller which presses the adhesive tire to the door sash frame.

11. The adhesive tape applicator according to claim 10, wherein the elastic roller is provided slidably in the axial direction of the elastic roller and a guide roller is provided which elastically contacts the door sash frame in said axial direction and keeps the elastic roller in a fixed position relative to the door sash frame.

12. The adhesive tape applicator according to claim 10, wherein the tape supply guide comprises a holder which slidably holds the adhesive tape, the holder having a swingable plate which is resiliently urged in the direction to cover the adhesive tape so that the adhesive tape does not come off the tape supply guide.

13. The adhesive tape applicator according to claim 10, wherein the tape supply guide is mounted on the second holding piece in a positionally adjustable manner relative to the widthwise direction of the adhesive tape.

14. An adhesive tape applicator which allies an adhesive tape attached to a release liner to a door sash frame of an automobile while removing the release liner as the adhesive tape applicator is moved along the door sash frame, the applicator comprising a holding element which can slidably hold the door sash frame, the holding element comprising
a pair of opposing first and second holding pieces, on the second holding piece are fixedly mounted slide shafts which extend through the first holding piece and slidably support the first holding piece, a grip is fixedly mounted at the ends of the slide shafts, an urging member which urges the first holding piece towards the pressing direction is disposed between the first holdings piece and at least one of the grip and the second holding piece, and the first holding piece has a projection onto which the fingers of the operator can be placed, a guide element which holds the door sash frame and slidably guides the applicator, and a pressing portion which presses the adhesive tape to the door sash frame, the guide element comprising nip rollers disposed opposite each other, at least two of the nip rollers being on one side and one being on the other side, the opposing nip rollers being supported so that they can be moved towards or away from each other and resiliently urged in a closing direction.

* * * * *

UNITED STATES PATENT AND TRADEMARK OFFICE
CERTIFICATE OF CORRECTION

PATENT NO. : 6,748,993 B1  Page 1 of 1
APPLICATION NO. : 10/110028
DATED : June 15, 2004
INVENTOR(S) : Mitsuhiko Shinozaki and Hisashi Ando It is certified that error appears in the above-identified patent and that said Letters Patent is hereby corrected as shown below:

Column 9, line 35, which reads "clam 1", should read -- claim 1 --

Column 9, line 41, which reads "a way", should read -- away --

Column 9, line 43, which reads "clam 1" should read -- claim 1 --

Column 9, line 49, which reads "according to according to", should read -- according to --

Column 9, line 63, which reads "niece", should read -- piece --

Column 10, line 34, please delete "[The adhesive tape......and second holding pieces,]"

Column 10, line 44, which reads "tire", should read -- tape --

Column 10, line 62, which reads "allies", should read -- applies --

Column 11, line 9, which reads "holdings", should read -- holding --

Signed and Sealed this

Fifteenth Day of April, 2008

JON W. DUDAS
*Director of the United States Patent and Trademark Office*